United States Patent
Byrnes et al.

[11] Patent Number: 5,110,260
[45] Date of Patent: May 5, 1992

[54] ARTICULATED HELICOPTER ROTRO WITH AN IMPROVED BLADE-TO-HUB CONNECTION

[75] Inventors: Francis E. Byrnes, White Plains, N.Y.; Edward S. Hibyan; William L. Noehren, both of Trumbull, Conn.

[73] Assignee: United Technologies Corporation, Hartford, Conn.

[21] Appl. No.: 628,270

[22] Filed: Dec. 17, 1990

[51] Int. Cl.⁵ .............................................. B64C 11/12
[52] U.S. Cl. ................... 416/134 A; 416/141
[58] Field of Search ............... 416/131, 132 R, 134 R, 416/134 A, 135, 141

[56] References Cited

U.S. PATENT DOCUMENTS

| | | |
|---|---|---|
| 2,853,141 | 9/1958 | Leoni . |
| 3,475,988 | 11/1969 | Ditlinger et al. ............ 416/134 A |
| 3,578,877 | 5/1971 | Mautz . |
| 3,759,632 | 9/1973 | Rybicki . |
| 4,012,169 | 3/1977 | Moville et al. ................... 416/141 |
| 4,108,508 | 8/1978 | Clinard, Jr. ..................... 416/141 |
| 4,163,630 | 8/1979 | Weiland ........................ 416/141 |
| 4,227,857 | 10/1980 | Reyers . |
| 4,242,048 | 12/1980 | McArdle . |
| 4,273,511 | 6/1981 | Mouille et al. . |
| 4,369,019 | 1/1983 | Lovera et al. . |
| 4,419,051 | 12/1983 | De Rosa . |
| 4,568,246 | 2/1986 | Hibyan et al. . |
| 4,585,393 | 4/1986 | Hibyan et al. . |
| 4,892,462 | 1/1990 | Barbier et al. . |

Primary Examiner—Edward K. Look
Assistant Examiner—Christopher M. Verdier
Attorney, Agent, or Firm—Vernon F. Hausechild

[57] ABSTRACT

An articulated helicopter rotor wherein the blade-to-hub connection consists of a spherical elastomeric bearing connected to the hub and a composite yoke connected thereto in series and consisting of a plurality of unidirectional high strength fibers bonded together to form a continuous strap which passes through a central opening in the elastomeric bearing and is pin-wrap connected to the hub at a single station and to the blade at two spaced stations produces a construction which is light in weight, easy to manufacture, ballistrically tolerant, redundant, and readily visually inspectable for structural integrity.

12 Claims, 3 Drawing Sheets

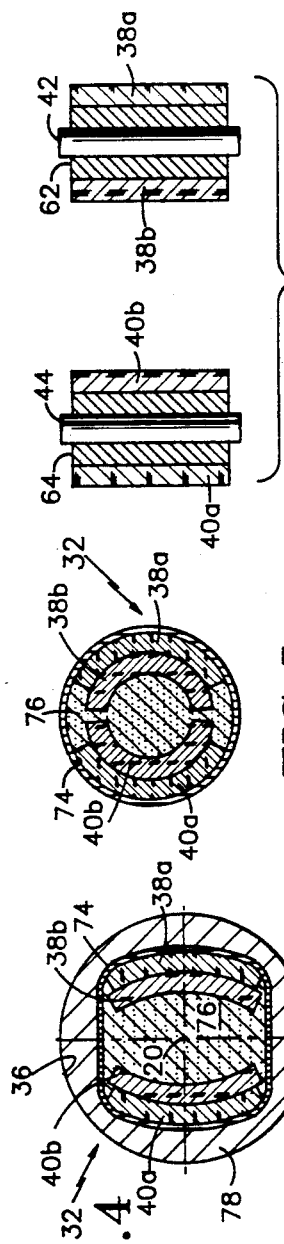
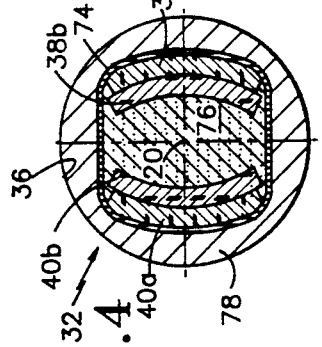
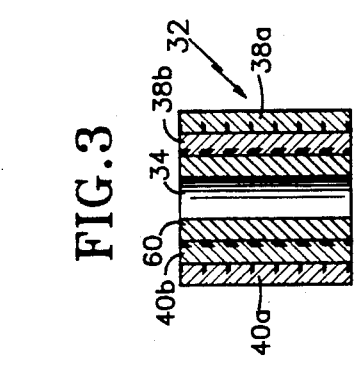
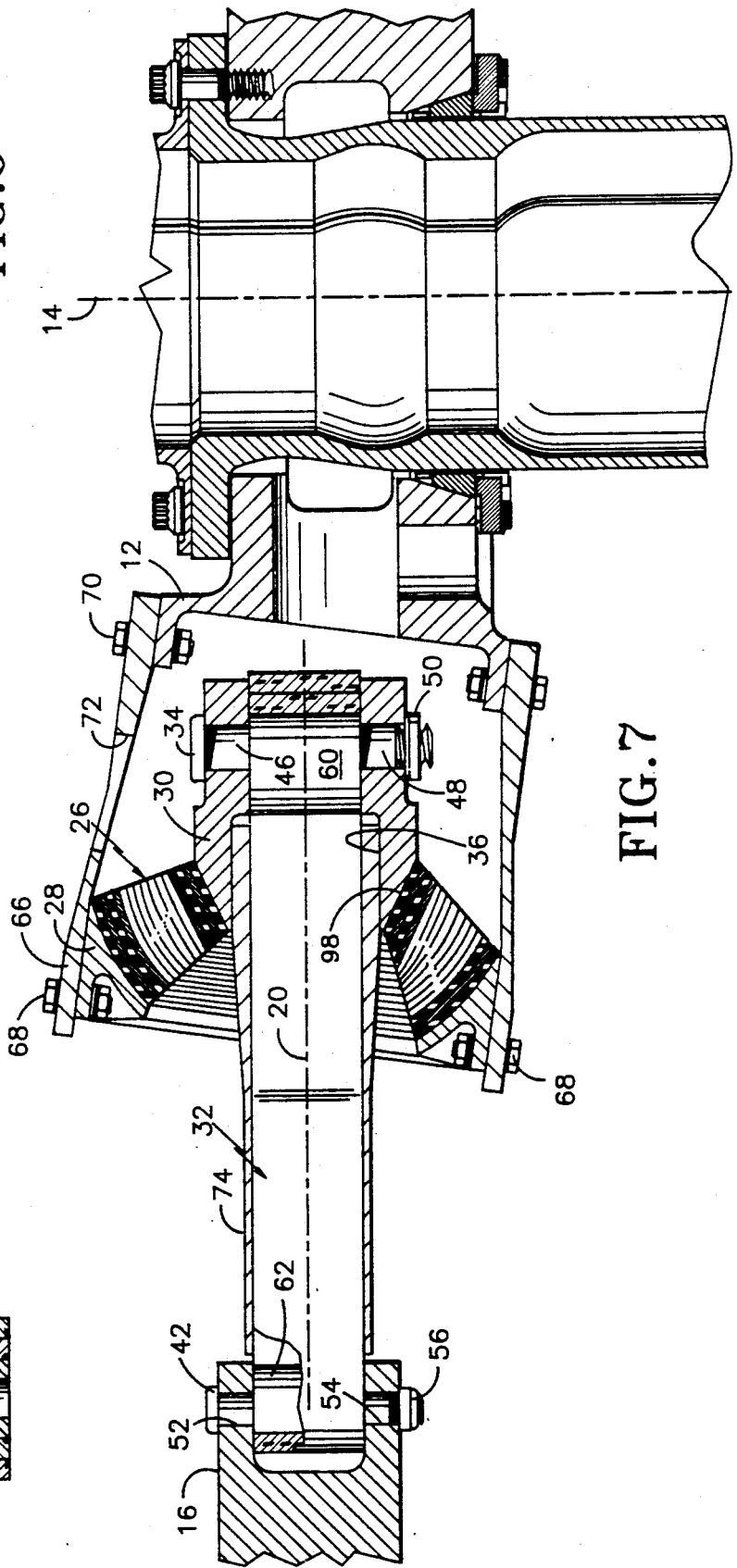

ARTICULATED HELICOPTER ROTRO WITH AN IMPROVED BLADE-TO-HUB CONNECTION

TECHNICAL FIELD

This invention relates to articulated helicopter rotors and more particularly to such a rotor in which the blade is connected to the hub through a unique blade-to-hub connection comprising a spherical elastomeric bearing connected to the hub and a composite yoke connected to the bearing in series, and which passes through a central opening in the bearing and consists of a continuous strap of high tensile strength fibers bonded together and connected to the hub and the blade in pin-wrap construction.

BACKGROUND OF THE INVENTION

In the helicopter rotor art, helicopters are generally divided into broad categories, namely, articulated rotor, flex-rotor and rigid rotor. In an articulated rotor, the helicopter blades are connected to the helicopter hub through a blade-to-hub connection so as to be supported from the helicopter rotor hub for rotation therewith, and so as to be moveable in pitch change (torsional), lead-lag (horizontal), and flapping (vertical) motion with respect to the hub, and to have the loads generated during the creations of these motions reacted from the helicopter blade through the blade-to-hub connection back to the hub. Centrifugal loads generated by the blades during rotation must similarly be reacted back to the hub. In articulated rotors, the blade is mounted and supported from the hub so as to be pivotable about fixed pitch change, lead-lag and flapping axes.

A flex-rotor is to be distinguished from an articulated rotor in that these motions and loads are established and accommodated by the flexibility of the parts involved.

In the early articulated rotor art, each blade was connected to the rotor through plain bearings, one of which was mounted for rotation about each of the lead-lag, pitch change and flapping axes. This construction was heavy, required lubrication, substantial maintenance and is expensive to manufacture and is not ballistically tolerant. Such a construction is shown in U.S. Pat. No. 2,853,141 to Leoni.

A substantial advancement in the art took place when Rybicki taught in U.S. Pat. No. 3,759,632 the substitution of elastomeric bearings for the plain bearings of the prior art. While we have retained the through bearing load path configuration of Rybicki, our invention advances the art by replacing the metallic spindle with a pin wrapped advanced composite strap which maintains prior characteristics of low drag and strength, but adds the inherent advanced features of composite materials.

Our invention incorporates modern composite materials into the yoke or spindle of a helicopter rotor and uses them in combination with a spherical elastomeric bearing to produce an articulated helicopter rotor in which the blades are capable of lead-lag, flapping and pitch change motion about coincident axes, and wherein the connection between the blades and the hub is capable of accommodating these motions and reacting these loads, while simultaneously reacting the centrifugal load generated by the blades during rotor rotation.

Use of high strength fibers in composite strap members is not new in the helicopter art, however, none of the prior art teaches the combination of a spherical elastomeric bearing connected in series to a continuously wrapped composite belt made of bonded high strength fibers pin wrap connected to the hub and blade, and passing through the central aperture of the elastomeric bearing to produce a composite yoke, which bearing and yoke coact to accommodate all of the pitch change, lead-lag and flapping motions and to react all pitch change, lead-lag, flapping and centrifugal loads between the helicopter blade and hub. For example, Barbier et al U.S. Pat. No. 4,892,462, granted Jan. 9, 1990, teaches the use of such bonded fibers pin-wrapped to the hub in a flex-rotor construction, but does not utilize that construction in combination with the spherical elastomeric bearing to obtain the advantages gained herein. DeRosa U.S. Pat. No. 4,419,051, granted Dec. 6, 1983, teaches an articulated helicopter rotor utilizing two bearings and a composite strap but with the composite strap positioned outboard of both bearings to thereby increase the frontal area and hence drag of the rotor. Reyes U.S. Pat. No. 4,227,857, granted Oct. 14, 1980, teaches a helicopter flex-rotor with no lead-lag or flapping bearings and a composite loop positioned outboard of the general rotor construction to similarly increase the frontal area and hence drag thereof. Mautz U.S. Pat. No. 3,578,877, granted May 18, 1971, teaches what appears to be a rigid rotor utilizing a composite straps pin connecting diametrically opposed blades to react blade centrifugal loads. Mouille et al U.S. Pat. No. 4,273,511, granted Jun. 16, 1981, teaches composite fibers pin wrapped to the hub and then extending through the entire blade for bonding thereto. McArdle U.S. Pat. No. 4,242,048, granted Dec. 30, 1980, teaches what is apparently a flex-rotor construction without articulating hinges in which criss-crossed flex-straps pin connects the blade to the hub. Lovera et al U.S. Pat. No. 4,369,019, granted Jan. 18, 1983, teaches a U-shaped yoke, presumably made of metal, to connect the helicopter blade to the hub and does not use pin-wrap construction. Such yokes fabricated of composite material are known to be old in Hibyan et al U.S. Pat. Nos. 4,585,393 and 4,568,246, granted on Apr. 29, 1986 and Feb. 4, 1986, respectively.

DISCLOSURE OF THE INVENTION

It is an object of this invention to teach an articulated helicopter rotor in which the blades are mounted and supported from the hub by means of a unique blade-to-hub connection which permits the blades to move in flapping, lead-lag and pitch change motion with respect to the hub, and in which the centrifugal and other loads generated by the blades during rotation are transferred to the hub thru this connection, which comprises modern composite materials and which therefore enjoys the advantages over the prior art of weight reduction, ease of manufacture, ballistic tolerance and visual inspectability.

It is a further object of this invention to teach such an articulated rotor in which the blades are connected to the hub by means of a spherical bearing and a composite material yoke or spindle connected in series between the hub and the blades. The spherical elastomeric bearing is connected to the hub and is shaped to be concentric about the intersection of the blade pitch change, flapping and lead-lag axes and serves to accommodate and react substantially all blade pitch change, lead-lag and flapping motions and loads. The composite yoke or spindle passes through a central aperture in the elastomeric bearing and is fabricated by bonding together in a plastic matrix a substantial number of high tensile strength fibers, such as fibers of fiberglass or graphite, which extend unidirectionally with respect to each other so as to form a continuous belt of composite material, which constitutes the yoke. The composite yoke is pin-wrap connected to the blade at two spaced stations and to the elastomeric bearing at one station, and serves to react and impart the centrifugal loads generated by the blade during rotation therethrough to and through the elastomeric bearing and then back to the hub.

It is still the further object of this invention to teach such a composite yoke in which the yoke is formed by bonding together a plurality of unidirectionally extending high tensile strength fibers bonded in an epoxy matrix, which composite yoke has the advantage of being light in weight, easy to manufacture, being ballistically tolerant since the severance of certain fibers will not impair the effectiveness of the remaining fibers, and which is visually inspectable for structural condition.

It is still the further object of this invention to teach such an articulated rotor in which the composite yoke is pin-wrap connected to the blade root at two spaced stations and to the elastomeric bearing inner race by pins of circular cross section and having elongated anchor bushings enveloping same to optimally distribute loads and stress at the pin-wrap connections, and which eliminates crack creating mechanical connections.

It is still a further feature of this invention to teach such an articulated helicopter rotor in which the blade pitch change, flapping and lead-lag motions and the shear load reaction are all accommodated by a single spherical elastomeric bearing assembly, and which requires no Teflon ® (registered trademark of E. I. DuPont) lined shear bearings as in the prior art.

It is still a further object of this invention to teach such an articulated helicopter rotor in which the composite yoke is shaped to be circular in cross-section at the station at which it passes through the central aperture in the elastomeric bearing, thereby permitting the use of the smallest elastomeric bearing which is capable of accommodating all flapping, lead-lag and pitch change motions of the blade and reacting all flapping, lead-lag, pitch change and centrifugal loads created by the blade.

It is a further object of this invention to teach such a rotor in which the composite yoke has an overwrap of composite material including bonded laminates having high strength fibers extending therethrough with the cross ply fibers of adjacent laminates extending substantially perpendicular to each other so as to increase the torsional, flapping and lead-lag stiffness of the composite yoke.

It is a further object of this invention to teach such a rotor in which the yoke is connected directly to the bearing inner race through a pin connection such that there is no relative motion which need be accommodated between the yoke and the bearing race, thereby eliminating the need for the Teflon lined shear bearing of the prior art. It should be noted that elimination of the life limited Teflon lined shear bearing produces an improvement in hub reliability and reduces maintenance costs.

It is a further object of this invention to teach such a helicopter rotor in which the composite yoke is pin connected to the blade and the elastomeric bearing inner race thereby achieving the advantage of minimum stress concentration, simplified installation and removal of the parts, and a simplified pin locking mechanism.

It is still a further object of this invention to teach a blade-to-hub connection for an articulated helicopter rotor which is capable of retrofit to helicopters presently in service.

BRIEF DESCRIPTION OF THE DRAWINGS

FIG. 3 is a view taken along line 3—3 of FIG. 1.
FIG. 4 is a view taken along line 4—4 of FIG. 1.
FIG. 5 is a view taken along line 5—5 of FIG. 1.
FIG. 6 is a view taken along line 6—6 of FIG. 1.
FIG. 7 is a showing of an alternate arrangement of the elastomeric bearing which forms part of our blade-to-hub connection mechanism.

BEST MODE OF CARRYING OUT THE INVENTION

Figure 1:
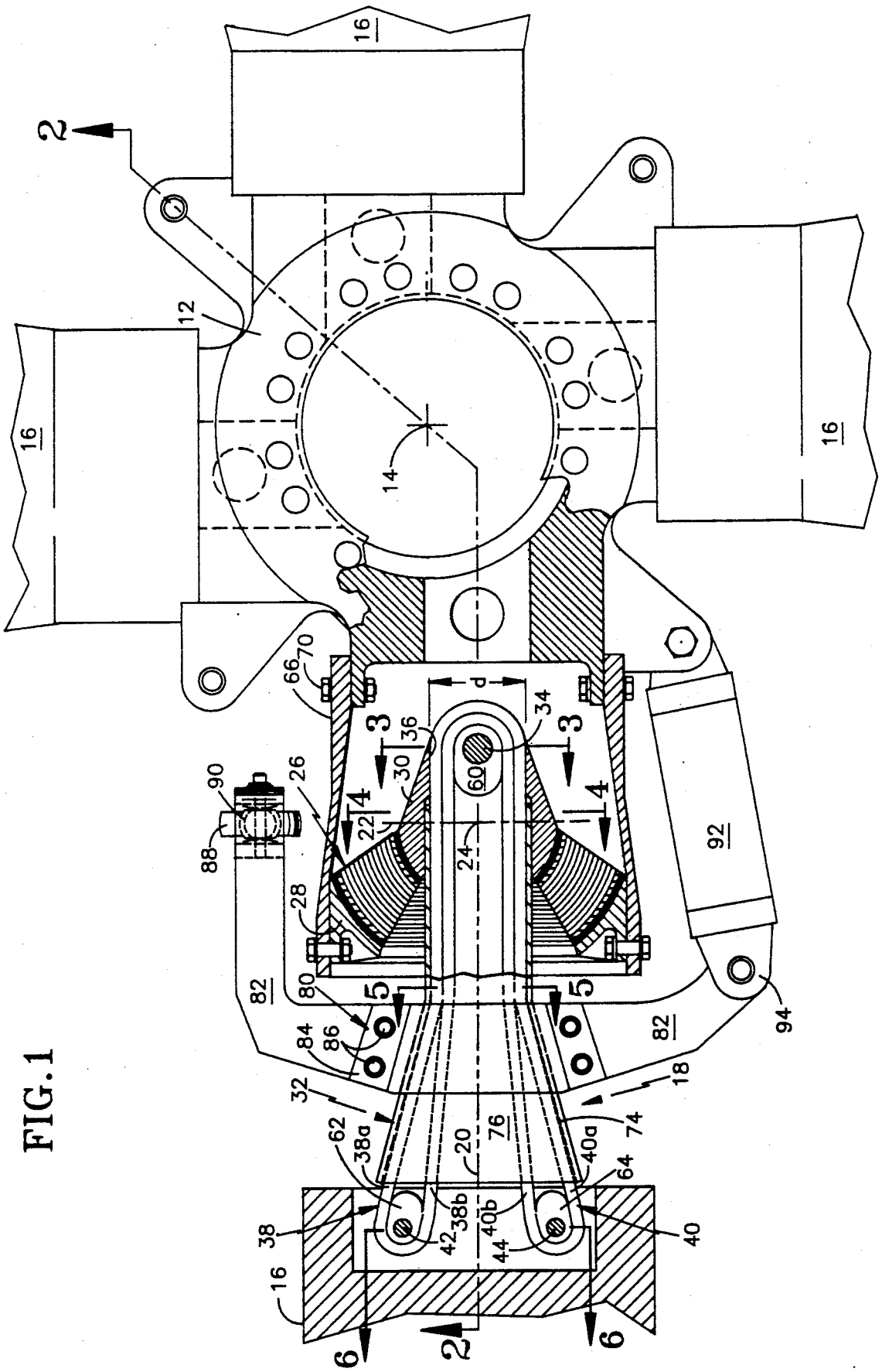
FIG. 1 is a top view, partially broken away, of an articulated helicopter rotor showing our blade-to-hub connection.

Viewing FIG. 1 we see the articulated helicopter rotor which comprises rotor hub 12 mounted for rotation about axis of rotation 14 and driven by a conventional engine and transmission system (not shown). A plurality of blades 16 extend radially from hub 12, and are each supported by blade-to-hub connector 18 to be movable in pitch change motion about pitch change axis 20, flapping motion about flapping axis 22 and lead-lag motion about lead-lag axis 23 (see FIG. 2) which is perpendicular to axes 20 and 22, and intersects axes 20 and 22 at point 24.

Blade-to-hub connector 18 includes spherical elastomeric bearing 26 which has an outer race 28, an inner race 30, and a plurality of spherical laminates positioned concentrically about point 24 and positioned between the inner and outer races 28 and 30. The spherical laminates are alternate laminates of rigid material and elastomer bonded to the races 28 and 30, as well known in the art. Connector 18 also includes composite yoke or spindle 32 which is connected in series to elastomeric bearing 26 and which consists of a plurality of a unidirectional high tensile strength fibers, possibly of fiberglass or graphite, bonded together in a resin, possibly epoxy or other, matrix to form a continuous strap with one end thereof wrapped around connecting or anchor pin 34 in double thickness and extending therefrom in bifurcated fashion through central aperture 36 in the bearing inner race into two legs 38 and 40, with leg 38 wrapping around connecting pin 42, and leg 40 wrapping around connecting pin 44 in pin-wrap fashion. Rovings of fiber or cloth could be used with or instead of these fibers in forming yoke 32, depending upon the strength and flexibility desired for yoke 32. By viewing FIG. 1 it will be noted that composite yoke 32 is of double thickness as it wraps around connecting pin 34, and is of single thickness as it wraps around connecting or anchor pins 42 and 44.

The circular cross-section of the connecting pins is ideally suited to carry the various loads between the blades and the hub since all surfaces are of the open section type, that is, devoid of stress concentration factors and free of crack initiating areas.

One of the advantages of this composite yoke 32 is that visual maintenance inspection thereof is readily possible by merely visually detecting delamination of the composite material. Further, in view of the many high strength fibers which are bonded together to fabricate yoke 32, the yoke is ballistically tolerant in that the severing of certain of these fibers does not destroy the structural integrity of the yoke.

As best shown in FIG. 1 yoke 32 forms into two legs 38a and 38b in passing around connecting pin 42 and similarly forms into two legs 40a and 40b in passing around connecting pin 44. An advantage of this construction is that the strength and stiffness of these legs can be controlled thru fabrication to suit the load carrying and stiffness requirements of yoke 32 in each rotor installation. Further, the legs 38a, 38b, 40a and 40b can be fabricated so that under the loss of any leg, the remaining structure can react full loads and accommodate all motions so as to make yoke 32 redundant, as well as ballistically tolerant.

Figure 2:
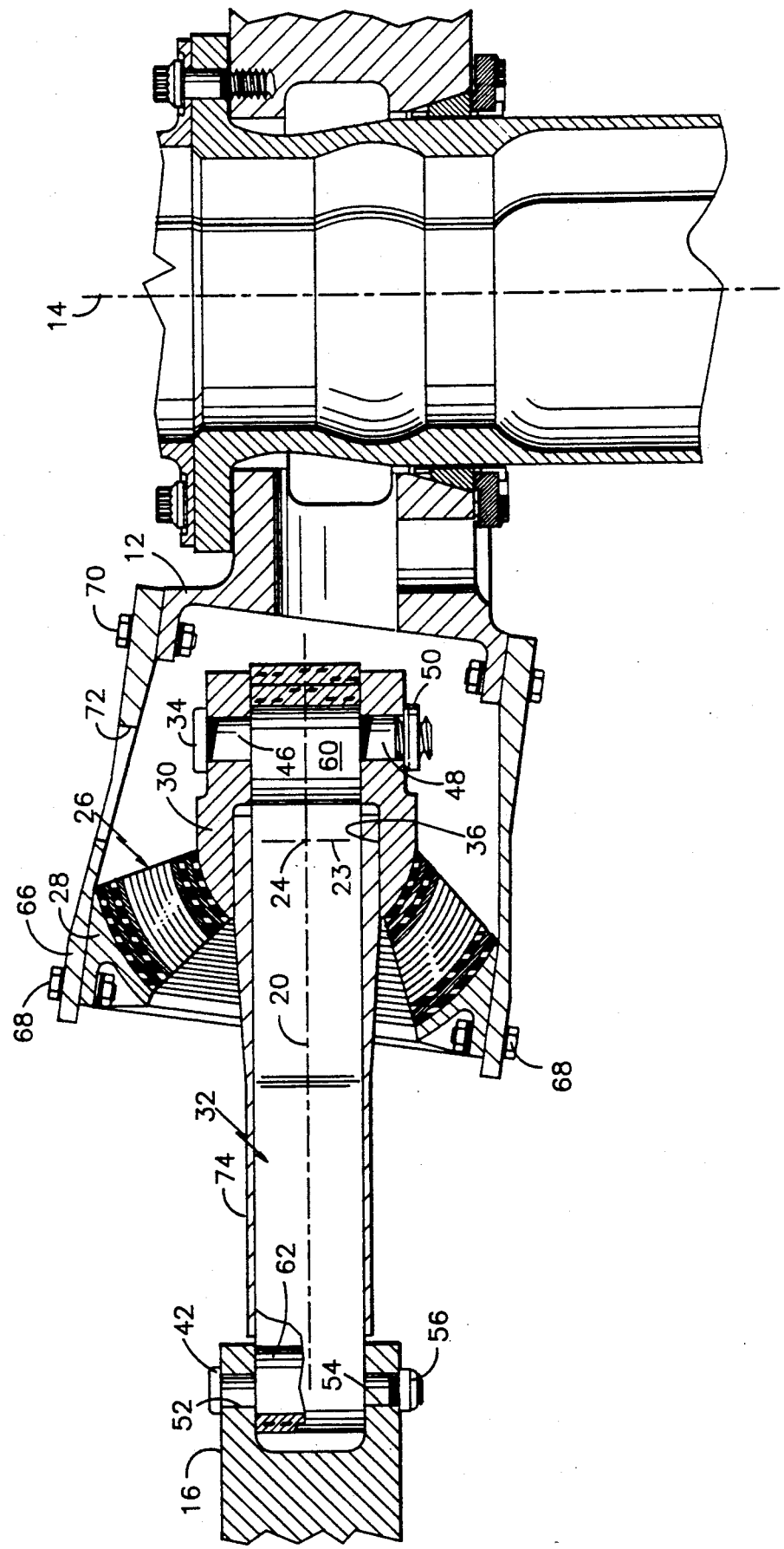
FIG. 2 is a view taken along line 2—2 of FIG. 1.

As best shown in FIG. 2, connecting pin 34 extends through aligned holes 46 and 48 in bearing inner race 30 and is locked in rigid position therein by conventional nut 50. Similarly, connecting pin 42 passes through aligned apertures 52 and 54 of the root of blade 16, while connecting pin 44 is passing through similarly aligned holes in the root of blade 16. Connecting pin 42 is rigidly connected to the blade root and locked in that position by a conventional nut 56. Pin 44 is similarly connected to the blade root. It will be noted that connecting pins 42 and 44 are positioned substantially equal distances on opposite sides of the blade pitch change axis 20. This two pin spaced connection is necessary to react lead-lag loads of the blade since lag axis 23, is positioned radially inboard thereof.

As shown in FIGS. 1 and 2, connecting pins 34, 42 and 44, which are preferably parallel to lead-lag axis 23, are enveloped by elongated or elliptically shaped anchor bushings 60, 62 and 64 which are positioned such that their longer axes extend substantially along pitch change axis 20 of blade 16. These anchor bushings serve the function of minimizing stress concentrations in the connection between the composite strap and the elastomeric bearing inner race, simplifying installation and removal of the centering pins, providing a simplified locking mechanism for the centering pins, and may be removed and installed through access holes,(to be described hereinafter), in the hub arm. The anchor bushings 60, 62 and 64 provide protection for the strap fibers and furnish greatly increased pin bending strength and a lower stress concentration in the wrapped fibers. The incorporation of elongated anchor bushings 60-64 reduces the stress concentration, resulting in improved bolt bending, to thereby allow a smaller than metal spindle diameter, and to also allow the use of a single spherical elastomeric bearing.

As shown in FIGS. 1 and 2, a hub arm 66 envelopes each elastomeric bearing 26. The hub arm 66 is fabricated of a composite material so as to gain the advantages thereof including being light in weight, easy of manufacture, and ballistic tolerance. Arm 66 is circular in cross-section at its radially outboard end where it is connected by a series of circumferentially positioned bolts 68 to bearing outer race 28. Hub arm 66 is connected at its radially inner end to rotor hub 12 by a series of circumferentially positioned connecting bolts 70. Hub arm 66 preferably includes one or more access ports 72 which not only provide access to bearing 26 and connecting pin 34 for inspection and maintenance, but also serve to lighten hub arm 66 and provide cooling for bearing 26 and the other mechanisms which it envelops.

Overwrap 74, which is made of laminates of composite material, possibly fiberglass, with adjacent cross ply laminates having high strength fibers therein extending substantially perpendicular to the fibers in adjacent laminates, envelops yoke 32 and is bonded thereto to provide pitch change (torsional), flapping (vertical) and lead-lag (horizontal) stiffness to yoke 38. Overwrap 74 permits see thru inspection and therefore does not prevent visual detection of delamination in the bonded fibers of yoke 32.

It is an important teaching of our invention that in the area where composite yoke 32 passes through central aperture 36 of inner race 30 of elastomeric bearing 26 that there be a snug fit between surface 36 and composite yoke 32, since this is the region of principal vertical load transfer (helicopter lift) between yoke 32 and inner race 30, and hence between blade 16 and hub 12.

In addition, it is important that in passing through elastomeric bearing 26, yoke 32 be of small geometric configuration to permit use of the smallest possible elastomeric bearing 26 capable of performing the required load carrying and motion accommodating functions. Accordingly, and as best shown in FIG. 3, composite yoke 32 envelops connecting pin 34 and its anchor bushing 60 such that the legs 38a-40a are outboard of legs 38b-40b and that each is of rectangular cross section and coact to form a double strap wrapping around pin 34 and bushing 60 within overwrap 74. Now progressing radially outwardly along pitch change axis 20 along composite yoke 32 we see that at the station thereof shown in FIG. 4, the legs 38a-40a and 38b-40b commence to curve about pitch change axis 20, and overwrap 74 changes shape in accommodation. Composite filler 76 is preferable glass fiber in a resin matrix and is positioned in between legs 38a-40a and 38b-40b. Additional composite filler 78 may be positioned between overwrap 74 and bearing inner race central aperture 36, if needed.

Progressing radially further out on yoke 32 we see at the FIG. 5 station that legs 38a-40a and 38b-40b, in cooperation with overwrap 74 and filler 76, are of a circular cross section. This is the station at which yoke 32 passes inwardly of elastomeric bearing 26. This construction is important to our invention since this circular cross-sectional shape of yoke 32 of minimum dimension or diameter "d" at the FIG. 5 station in- board of elastomeric bearing 26 permits the use of the smallest elastomeric bearing 26 which is capable of accommodating all blade motions and reacting all blade loads encountered and generated in flapping, lead-lag and pitch change. Experience shows that having to increase the size of the elastomeric bearing 26, not only increases the weight of the aircraft and increases the envelope within which the elastomeric bearing can be received but also elastomeric bearing life can be seriously compromised if the elastomer outer radius is increased to the point where required tangential elastomer motions, such as pitch change arc requirements, results in excessively high strain levels. Also, the metallic reinforcement shims are subjected to higher bending loads requiring even thicker metal shims.

Now viewing FIG. 6, which shows the radially outer end of yoke 32, we see that yoke legs 38a, 38b, 40a and 40b have returned to rectangular shape in cross-section as they loop around connecting pins 42 and 44 and their associated anchor bushings 62 and 64.

It will also be seen that shaped composite filler 76 fills all voids between legs 38 and 40 throughout the radial dimension of yoke 32. As best shown in FIG. 1, composite filler 76 also fills the region between the bifurcated legs 38 and 40. Filler 76 serves to add additional rigidity and hence load carrying capability to yoke 32, in cooperation with overwrap 74, to better react pitch change, lead-lag and flapping loading, while retaining required flexibility.

As best shown in FIG. 1, pitch change mechanism 80 includes members 82 and 84 which extend over and under composite yoke 32 and are connected by bolt mechanisms 86 to snugly engage yoke 32 at a radial station between the blade root and hub arm 66. Pitch change member 82, is connected to pitch change rod 88 through spherical joint 90. Pitch change rod 88 is operable in a vertical direction to cause pitch change mechanism 80 to cause yoke 32 and hence blade 16 to rotate about pitch change axis 20 to affect pitch change of the blade both cyclically or collectively with the other blades of the helicopter rotor. Member 82 of pitch change mechanism 80 also engages elastomeric lead-lag damper 92, to which it pivotally connects at pivot joint 94.

It will therefore be seen that our construction produces a blade-to-hub connector 18 in which all blade pitch change, lead-lag and flapping motion and loading is reacted by elastomeric bearing 26, while all blade centrifugal loading is reacted by composite yoke 32 which transmits that centrifugal loading to hub 12 through the elastomeric bearing 26 and hub arm 66.

It will be further be noted that by disconnecting connecting bolts 70 and centering pins 42 and 44, an entire unit of composite yoke 32, elastomeric bearing 26 and hub arm 66 may be rapidly removed for replacement. Similarly, by removing connecting pins 34, 42 and 44, yoke 32 may readily be replaced.

As best shown in FIG. 7 the inner most shims 98 of elastomeric bearing could be made conical rather than spherical, so as to increase the shear load carrying capability of the elastomeric bearing.

It will therefore be seen that our improved articulated rotor includes a blade-to-hub connection 18 which comprises a spherical elastomeric bearing connected in series with a composite yoke, with the bearing connected to the hub, and the yoke pin-wrap connected to the bearing and to the blade at two spaced stations while passing through the central aperture of the elastomeric bearing. Our configuration results in a system which meets high aircraft standards of weight efficiency and ballistic tolerance, and is both redundant and visually inspectable, while providing suitable distribution of loads and strength characteristics.

While it is an important teaching of our invention that yoke 32 be made of composite material to achieve the advantages just described, an operable and efficient construction is achieved if yoke 32 were fabricated of metal using anchor pin retention.

Having thus described a typical embodiment of the invention, that which is claimed as new and desired to secure by Letters Patent of the United States is:

1. An articulated helicopter rotor comprising:
 a) a rotor hub mounted for rotation about an axis of rotation;
 b) a plurality of blades extending radially from said hub;
 c) means connecting each of said blades to said hub so as to permit said blade to move freely in flapping, lead-lag, and pitch change motion with respect to the hub about intersecting flapping, lead-lag and pitch change axes, and to react loads associated with such motions and to transfer said loads together with centrifugal loads generated by the blade during rotation into said hub comprising:
 1) a spherical elastomeric bearing laminate comprising alternate layers of rigid material and elastomer positioned between a bearing inner race and a bearing outer race and being concentric about an intersection of the blade pitch change, lead-lag and flapping axes, said inner race having a central aperture extending therethrough and enveloping the blade pitch change axis, said inner race also having aligned apertures in the walls thereof on opposite sides of the central aperture and positioned radially inboard of the spherical bearing laminate;
 2) means connecting the bearing outer race to the hub;
 3) a first connecting pin extending through said aligned apertures in the blade inner race and connected thereto;
 4) second and third connecting pins positioned laterally on opposite sides of the blade pitch change axis, extending substantially parallel to the first connecting pin, and connected to the blade root;
 5) a composite yoke comprising a plurality of unidirectional high tensile strength fibers bonded together in a resin matrix to form a continuous loop shaped to wrap around said first connecting pin and extend therefrom in bifurcated fashion through said elastomeric bearing inner race central aperture and with first and second legs of the bifurcated yoke respectively wrapping around said second and third connecting pins to thereby connect said blade to said hub so that all blade pitch change, lead-lag and flapping motions are accommodated by said yoke and spherical bearing, and all of the pitch change, lead-lag and flapping loads and the blade centrifugal load generated during rotation are carried by said composite yoke through said elastomeric bearing to said hub.

2. An articulated helicopter rotor according to claim 1 wherein said composite yoke is shaped to be substantially rectangular in cross-section and of double thickness at the station where is wraps around said first connecting pin, and transgresses therefrom into a substantially circular cross-sectional shape as is passes within the elastomeric bearing spherical laminate so as not to interfere with the pitch change, lead-lag and flapping excursions of the elastomeric bearing and to permit minimizing the size and weight of the elastomeric bearing, and wherein the composite yoke transgresses back into a rectangular cross-sectional shape at the stations where its bifurcated legs wrap around the second and third connecting pins in single thickness.

3. An articulated helicopter rotor according to claim 2 and including a composite overwrap comprising at least two laminates of material having high tensile strength fibers therein, and with the fibers of adjacent laminates extending substantially perpendicular to each other, which overwrap envelopes the composite yoke and extends at least between the second and third connecting pins and the spherical bearing inner race and is bonded to the composite yoke to provide torsional and inplane stiffness to the yoke as the blade moves in flapping, lead-lag, and pitch change motion, and high shear load carrying capability to the yoke, as well as serving as an outer closure therefore.

4. An articulated helicopter rotor according to claim 3 and including elliptically shaped anchor bushings enveloping each connecting pin and positioned between the connecting pin and the composite yoke to increase the strength and durability of the wrap-around connection being made by the composite yoke and the connecting pins.

5. An articulated helicopter rotor according to claim 4 and including a hub arm made of a composite material and extending radially from the hub, and being releasably connected to the rotor hub at its radially inner end and enveloping the elastomeric bearing and the first connecting pin, and being releasably connected to the elastomeric bearing outer race at its outer end to thereby protect the elastomeric bearing, and so that the hub arm, elastomeric bearing and the composite yoke can be removed as a unit for replacement by merely disconnecting the hub arm from the hub and the composite yoke from the second and third connecting pins.

6. An articulated helicopter rotor according to claim 5 and wherein there is at least one access hole in a wall of the hub arm to provide access to the elastomeric bearing and the first connecting pin, to provide heat release therefrom, to reduce the weight of the hub arm and provide visual inspectability.

7. An articulated helicopter rotor according to claim 6 and including a pitch change mechanism engaging the composite yoke at a station between the blade root and the hub arm and operable to cause said yoke and hence said blade to rotate in pitch change motion about the blade pitch change axis.

8. An articulated helicopter rotor according to claim 7 and including a filler made of composite material filling all voids within the composite yoke for yoke strengthening purposes.

9. An articulated helicopter rotor according to claim 8 and where the inner bearing laminate is conical to increase the shear load carrying capacity of the elastomeric bearing.

10. An articulated helicopter rotor according to claim 9 wherein the yoke is fabricated of metal.

11. An articulated helicopter rotor according to claim 2 wherein the central aperture of the elastomeric bearing inner race and the composite yoke are fabricated such that the composite yoke snugly engages said central aperture in passing therethrough so that helicopter lift forces are readily transmitted between the composite yoke and the spherical bearing inner race during the transmission of blade lift loads to the hub.

12. An articulated helicopter rotor according to claim 9 and wherein said connecting pins extend substantially parallel to the blade lead-lag axis.

* * * * *